(12) United States Patent
Ogunnaike et al.

(10) Patent No.: US 7,203,555 B2
(45) Date of Patent: Apr. 10, 2007

(54) PREDICTIVE REGULATORY CONTROLLER

(75) Inventors: Babatunde A. Ogunnaike, Hockessin, DE (US); Kapil Mukati, Newark, DE (US)

(73) Assignee: University of Delaware, Newark, DE (US)

( * ) Notice: Subject to any disclaimer, the term of this patent is extended or adjusted under 35 U.S.C. 154(b) by 286 days.

(21) Appl. No.: 10/845,840

(22) Filed: May 14, 2004

(65) Prior Publication Data

US 2005/0256593 A1 Nov. 17, 2005

(51) Int. Cl.
G05B 13/02 (2006.01)
G05B 15/02 (2006.01)

(52) U.S. Cl. .................. 700/28; 700/9; 700/31

(58) Field of Classification Search ............. 700/9, 700/28–30, 38, 44, 33, 31, 37, 78, 52
See application file for complete search history.

(56) References Cited

U.S. PATENT DOCUMENTS

| | | | | |
|---|---|---|---|---|
| 4,609,853 A | * | 9/1986 | Mattern | 318/363 |
| 5,442,544 A | | 8/1995 | Jelinek | |
| 6,167,360 A | * | 12/2000 | Erickson et al. | 703/6 |
| 6,207,936 B1 | * | 3/2001 | de Waard et al. | 219/497 |
| 6,373,033 B1 | * | 4/2002 | de Waard et al. | 219/497 |
| 6,735,483 B2 | * | 5/2004 | Martin et al. | 700/29 |
| 6,819,964 B2 | * | 11/2004 | Harmse | 700/29 |
| 6,823,675 B2 | * | 11/2004 | Brunell et al. | 60/773 |
| 6,901,300 B2 | * | 5/2005 | Blevins et al. | 700/46 |
| 6,970,857 B2 | * | 11/2005 | Card et al. | 706/19 |
| 6,988,017 B2 | * | 1/2006 | Pasadyn et al. | 700/121 |
| 2005/0209713 A1 | * | 9/2005 | Fuller | 700/29 |

* cited by examiner

*Primary Examiner*—Thomas Pham
(74) *Attorney, Agent, or Firm*—RatnerPrestia (57) ABSTRACT

Methods and apparatus for adjusting control signal values for use in controlling a plant to conform a system parameter to a set-point are disclosed. To adjust control signal values, a reference trajectory for the set-point is generated based on a set-point tracking tuning parameter. A current disturbance value for the system parameter is estimated based on a robustness tuning parameter, a model prediction value resulting from a control signal value associated with the system parameter, and an actual system value associated with the system parameter. A future disturbance value is predicted based on the estimated current disturbance value and a disturbance rejection tuning parameter. The control signal value associated with the system parameter is then adjusted based on the reference trajectory, the model prediction value, the future disturbance value, and an aggressiveness tuning parameter.

22 Claims, 6 Drawing Sheets

PREDICTIVE REGULATORY CONTROLLER

FIELD OF THE INVENTION

The present invention relates to the field of electronics and, more particularly, to regulatory controllers for adjusting control signal values for use in controlling a plant to conform system parameter to set-points.

BACKGROUND OF THE INVENTION

Regulatory controllers are designed to adjust a variable of a plant (e.g., a device or process) automatically to conform a parameter of the plant (e.g., temperature, pressure, fluid level, etc.) to a particular value (referred to herein as the "set-point") based on feedback for the parameter. For example, a regulatory controller may automatically adjust a control signal value supplied to a valve controlling fluid flow (the "variable") into a tank to maintain the fluid level (the "parameter") of the tank at a particular level (the "set-point") based on fluid level feedback from the tank.

The performance of a regulatory controller is typically determined by its robustness, set-point tracking, and disturbance rejection. Robustness is the ability of the controller to remain stable when an actual parameter deviates from a model on which the regulatory controller is based. Set-point tracking is the ability of a regulatory controller to cause a parameter to follow a specified trajectory between a current set-point and a new set-point. Disturbance rejection is the ability of a regulatory controller to counteract the effects of external disturbances that would otherwise cause a parameter to deviate from a desired set-point. In addition, the performance of a regulatory controller is often determined based on its aggressiveness, which is the degree of vigorousness with which the regulatory controller attempts to maintain a parameter at a particular level.

Proportional, integral, derivative (PID) controllers, which are relatively inexpensive, are the most common type of regulatory controller used in process control applications. It is difficult to tune a PID controller, however, to meet robustness, set-point tracking, and disturbance rejection objectives because tuning parameter for PID controllers are not directly tied to individual ones of these objectives. The tuning parameters used in PID controllers each affect two or more of the typical objectives used to measure regulatory controller performance, which makes it difficult, if not impossible, to achieve certain performance objectives with PID controllers. For example, a PID controller cannot be tuned to achieve good set-point tracking and disturbance rejection simultaneously.

Other controllers such as fuzzy logic controllers, general linear controllers, state feedback controllers, and observer controllers are able to achieve better results than PID controller. Compared to PID controllers, however, these controllers are relatively complex and expensive.

There is an unmet need for inexpensive regulatory controllers that are easily tuned for robustness, set-point tracking, and disturbance rejection. The present invention addresses this need among others.

SUMMARY OF THE INVENTION

The present invention is embodied in methods and apparatus for adjusting control signal values for use in controlling a plant to conform a system parameter to a set-point. To adjust control signal values, a reference trajectory for the set-point is generated based on a set-point tracking tuning parameter. A current disturbance value for the system parameter is estimated based on a robustness tuning parameter, a model prediction value resulting from a control signal value associated with the system parameter, and an actual system value associated with the system parameter. A future disturbance value is predicted based on the estimated current disturbance value and a disturbance rejection tuning parameter. The control signal value associated with the system parameter is then adjusted based on the reference trajectory, the model prediction value, the future disturbance value, and an aggressiveness tuning parameter.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
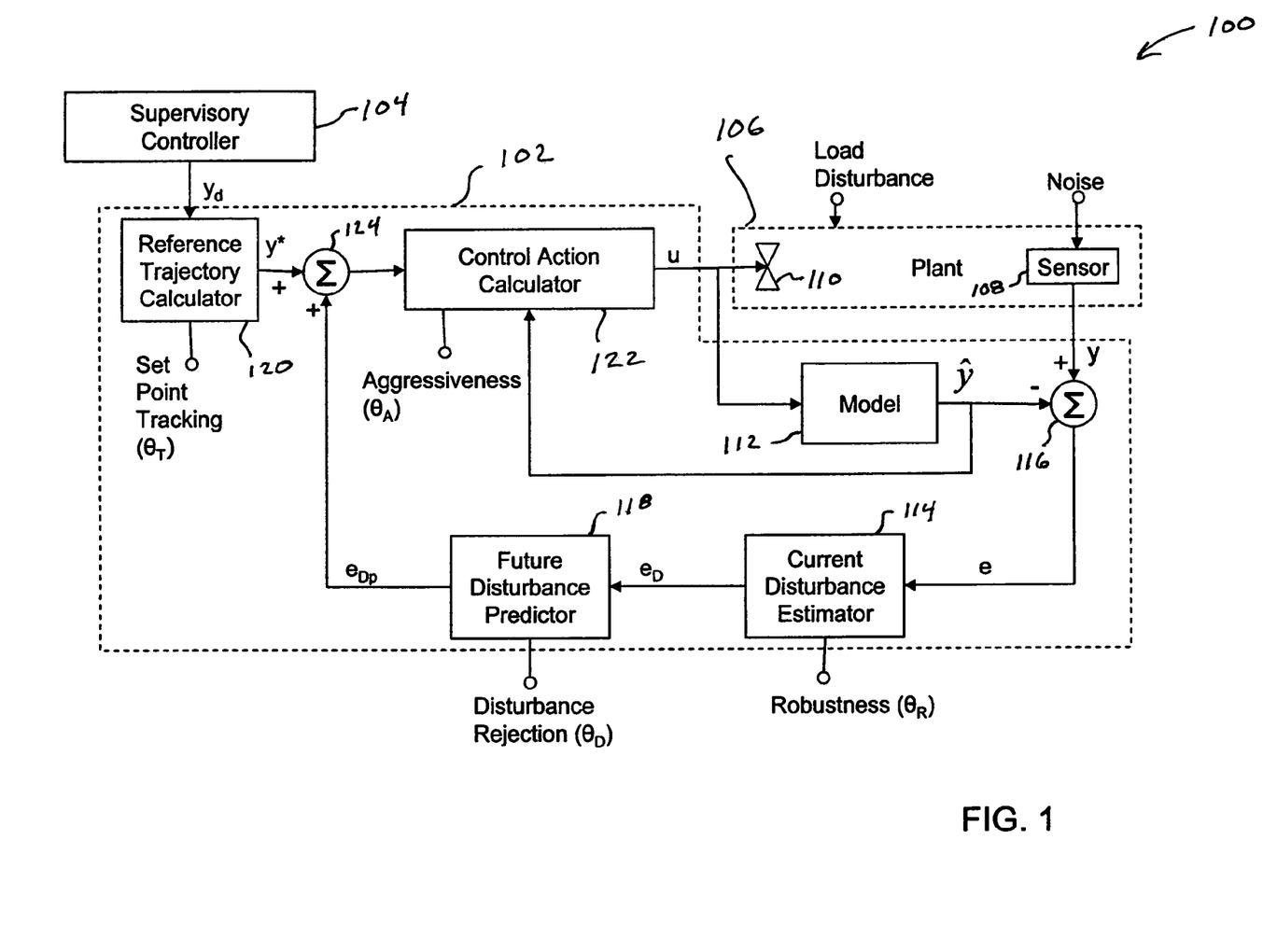
FIG. 1 is a block diagram of an exemplary regulatory system in accordance with the present invention.

FIG. 1 is a conceptual representation of an exemplary control system 100 including an exemplary regulatory controller 102 in accordance with the present invention. Functions of one or more blocks within the illustrated regulatory controller 102 can be performed by the same piece of hardware or module of software. It should be understood that embodiments of the present invention may be implemented in hardware, software, or a combination thereof. In such embodiments, the various component and steps described below may be implemented in hardware and/or software.

A supervisory controller 104 oversees the operation of one or more regulatory controllers (represented by regulatory controller 102) to control one or more respective system parameters associated with a plant 106, which may have a total of one or more system parameters. As used herein, the term plant is used generally to refer to essentially any regulatory process or device including by way of non-limiting example, industrial processes, residential and commercial temperature regulation devices, automotive devices such as cruise control, or essentially any process or device in which one or more regulatory controllers are conventionally used.

Set-points and tuning parameters are supplied to the regulatory controller 102. In an exemplary embodiment, the supervisory controller 104 supplies the set-points to the regulatory controller 102 and a control engineer supplies the tuning parameters, e.g., directly or via the supervisory controller 104. The tuning parameters determine how the regulatory controller 102 reacts to set-point changes, load disturbances, and noise, and are described in greater detail below. Based on a current set-point, the tuning parameters, and feedback received via a sensor 108 associated with the system parameter, the regulatory controller 102 attempts to conform the system parameter to the current set-point by regulating a controlled device 110 (e.g., a switch, valve, etc.) able to affect the system parameter. For example, if the system parameter is a water level within a tank, the regulatory controller 102 may regulate a controlled device such as a water supply valve to adjust the flow of water into the tank to maintain the water level at the set-point.

The regulatory controller 102 will now be described in detail. The regulatory controller 102 adjusts a control signal value (u) to control the controlled device 110 able to affect the system parameter. The control signal value (u) is initially zero and is updated based on actual system values (y) received from a sensor 108 associated with the system parameter to be controlled.

A model 112 generates a model prediction value (ŷ) indicating how a system parameter of the plant is going to behave. In an exemplary embodiment, the model 112 is a first order plus dead time (FOPDT) model. The model 112 represents a process gain, a process time constant, and a process time delay of a process reaction curve for the system parameter. The calculation of the model prediction value (ŷ) is described in greater detail below.

A current disturbance estimator 114 estimates a current disturbance value ($e_D$) for the system parameter. The current disturbance value ($e_D$) is an estimate of external disturbances that are being introduced to the system parameter. In an exemplary embodiment, the current disturbance value ($e_D$) is estimated based on a current model error (e), one or more previously calculated estimated disturbance values, and a robustness parameter ($\theta_R$). The current model error (e) is the difference between the model prediction value (ŷ) and the actual system value (y), which may be calculated using a summation circuit 116 to subtract the model prediction value (ŷ) from the actual system value (y). The robustness tuning parameter ($\theta_R$) affects the ability of the regulatory controller 102 to remain stable and conform the system parameter to the set-point in the presence of differences between predictions by the model 112 and actual system parameter values. In an exemplary embodiment, the robustness tuning parameter ($\theta_R$) is normalized, e.g., to a value between zero and one. The calculation of the current disturbance value ($e_D$) is described if further detail below.

A future disturbance predictor 118 predicts a future disturbance value ($e_{Dp}$). The future disturbance value ($e_{Dp}$) is a value predicting the future effect of external disturbances on the system parameter. In an exemplary embodiment, the future disturbance value ($e_{Dp}$) is based on a current disturbance value ($e_D$), one or more previously calculated disturbance values, and a disturbance rejection tuning parameter ($\theta_D$). The disturbance rejection tuning parameter ($\theta_D$) affects the ability of the regulatory controller 102 to counteract load disturbances introduced to the system parameter. In an exemplary embodiment, the disturbance rejection tuning parameter ($\theta_D$) is normalized, e.g., to a value between zero and one. The calculation of the future disturbance value is described in further detail below.

A reference trajectory calculator 120 generates a reference trajectory (y*) for transitioning the system parameter between set-points. For example, if the system parameter is temperature and the set-point for the system parameter changes from 70 degrees to 80 degrees, the reference trajectory calculator 120 generates a reference trajectory for the system parameter to which the regulatory controller 102 attempts to conform the system parameter. In an exemplary embodiment, the reference trajectory (y*) is based on a set-point ($y_d$) from the supervisory controller 104, at least one previously calculated reference trajectory, and a set-point tracking tuning parameter ($\theta_T$). The set-point tracking tuning parameter ($\theta_T$) affects the ability of the regulatory controller 102 to follow a specified trajectory between a current set-point and a new set-point. In an exemplary embodiment, the set-point tracking tuning parameter ($\theta_T$) is normalized, e.g., to a value between zero and one. The calculation of the reference trajectory (y*) is described in further detail below.

A control action calculator 122 adjusts the control signal value (u) for controlling the device (or process) 108 within the plant 106 based on the predicted disturbance ($e_{Dp}$), reference trajectory (y*), and an aggressiveness tuning parameter ($\theta_A$). In an exemplary embodiment, the control signal value (u) is calculated based on an updated projected error in the absence of any control. The updated projected error is based on the reference trajectory (y*), the model prediction value (ŷ), an m-term weighted sum of previous control actions (described below), and the predicted future disturbance value ($e_{Dp}$). A control signal value (u) to minimize projected error is then calculated based on the updated projected error in the absence of control action over a desired prediction horizon (described below), where the desired prediction horizon is based on the aggressiveness tuning parameter ($\theta_A$). The aggressiveness tuning parameter ($\theta_A$) affects the degree of vigorousness with which the regulatory controller 102 attempts to maintain the system parameter at the set-point. In an exemplary embodiment, the aggressiveness tuning parameter ($\theta_A$) is normalized, e.g., to a value of between zero and one. The calculation of the control signal value is described in further detail below.

Figure 2:
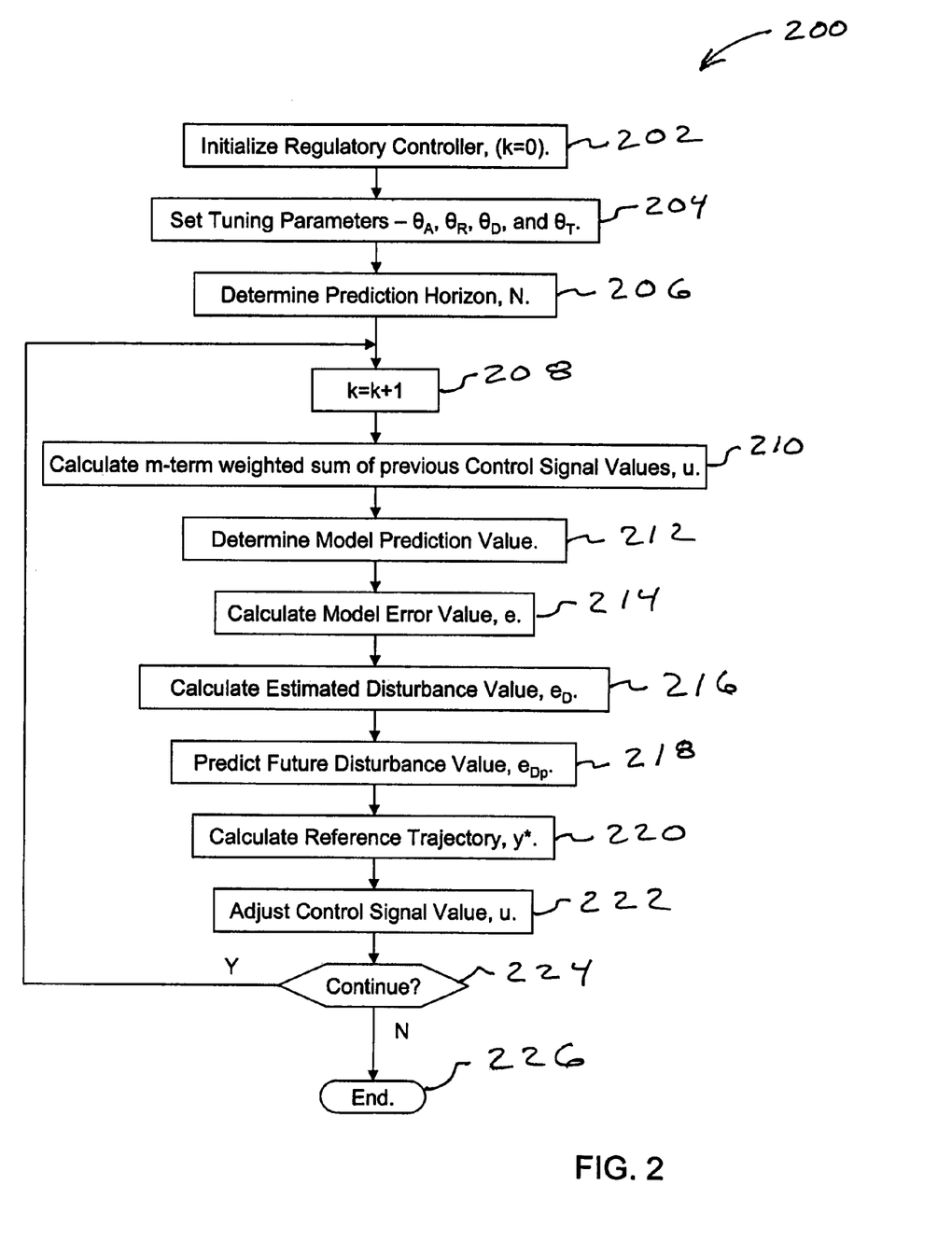
FIG. 2 is a flow chart of exemplary regulatory steps in accordance with the present invention.

FIG. 2 depicts a flow chart 200 of exemplary regulatory steps for adjusting control signal value in accordance with the present invention, e.g., using the regulatory controller 102 of FIG. 1. The exemplary steps make reference to a sample (k), a sampling time (Δt), a process gain (K), a time constant (τ), a dead time (α), a first model parameter (a), a second model parameter (b), and a third model parameter (m). The first model parameter is calculated as shown in equation (1).

$$a = e^{-\frac{\Delta t}{\tau}} \quad (1)$$

The second model parameter is calculated as shown in equation (2).

$$b = K(1 - e^{-\frac{\Delta t}{\tau}}) \quad (2)$$

The third model parameter defines the number of terms (samples) of previous control signal values used for weighting purposes and is calculated as shown in equation (3).

$$m = \text{round}\left(\frac{\alpha}{\Delta t}\right) \quad (3)$$

At block 202, the regulatory controller 102 is initialized. In an exemplary embodiment, the control signal value [u(k)], actual system value [y(k)], model prediction value [ŷ(k)], and the estimated current disturbance value [$e_D$(k)] are set to zero for a first sample (e.g., k=1, u(1)=0, y(1)=0, ŷ(1)=0, and $e_D$(1)=0).

At block 204, the tuning parameters are set. In an exemplary embodiment, the robustness tuning parameter ($\theta_R$), the disturbance rejection tuning parameter ($\theta_D$), the set-point tracking tuning parameter ($\theta_T$), and the aggressiveness tuning parameter ($\theta_A$) are each set independently, e.g., by the control engineer. The tuning parameters may each be set to a value within a full scale range normalized to between zero and one.

At block 206, a prediction horizon (N) is determined. In an exemplary embodiment, the prediction horizon (N) is calculated as shown in equation (4).

$$N = 1 - \frac{\tau}{\Delta t}\log(1 - \theta_A) \quad (4)$$

As described in greater detail below, the prediction horizon (N), which is based at least in part on the aggressiveness tuning parameter ($\theta_A$), influences the aggressiveness of the regulatory controller 102 (FIG. 1) by specifying the number of samples considered when adjusting the control signal value (u).

At block 208, a sample counter for the regulatory controller is incremented (e.g., by one; k=k+1).

At block 210, an m-term weighted sum of previous control signal values is calculated. In an exemplary embodiment, the m-term weighted sum of previous control signal values is calculated as shown in equation (5).

$$\mu(k, m) = \sum_{i=1}^{m} a^i u(k - i) \quad (5)$$

At block 212, a model prediction value (ŷ) is determined from the model 112 (FIG. 1) for the plant 106 (FIG. 1). In an exemplary embodiment, the model 112 is a discrete FOPDT model for which the model prediction value is calculated as shown in equation (6).

$$ŷ(k)=aŷ(k-1)+bu(k-m-1) \quad (6)$$

At block 214, a model error value (e) is calculated. In an exemplary embodiment, the summation circuit 116 (FIG. 1) calculates the model error value by subtracting the model prediction value determined in the step of block 212 from an actual system value measured for the plant 106 (FIG. 1), e.g., by the sensor 110.

At block 216, an estimated disturbance value ($e_D$) is estimated based at least in part on the model error value (e) calculated by the step in block 214 and the robustness tuning parameter ($\theta_R$). In an exemplary embodiment, the estimated disturbance value ($e_D$) is an estimated external disturbance value and is calculated as shown in equation (7).

$$e_D(k)=\theta_R e_D(k-1)+(1-\theta_R)e(k) \quad (7)$$

The estimated external disturbance value represents the effect of "external" disturbance and ideally ignores inherent uncertainties of the model that are due to fundamental ignorance about the true process structure. Estimating current disturbance values in this manner avoids permanently biasing the model prediction values. As the robustness tuning parameter ($\theta_R$) approaches zero, more of the model error value (e) is estimated as due to the effect of external disturbance (implying good model integrity) and, thus, the model error value (e) is lightly filtered when estimating the current disturbance value ($e_D$). As the robustness tuning parameter ($\theta_R$) approaches one, less of the model error value (e) is estimated as due to the effect of external disturbance with more attributed to the inherent uncertainties of the model and, thus, the model error value (e) is heavily filtered.

At block 218, a future disturbance value ($e_{Dp}$) is predicted based at least in part on the current disturbance value ($e_D$) estimated by the step in block 216 and the disturbance rejection tuning parameter ($\theta_D$). In an exemplary embodiment, the predicted future disturbance value is calculated as shown in equations (8) and (9).

$$e_{Dp}(k+m+i) = e_D(k) + \frac{(1-\theta_D)}{\theta_D}[1-(1-\theta_D)^{m+i}]\nabla e_D(k) \quad (8)$$

where $$\nabla e_D(k)=e_D(k)-e_D(k-1) \quad (9)$$

As the disturbance rejection tuning parameter ($\theta_D$) approaches zero, more weight is given to the difference between the estimated current disturbance value and a previously estimated current disturbance value than to the current disturbance value alone—resulting in aggressive disturbance rejection. As the disturbance rejection tuning parameter ($\theta_D$) approaches one, less weight is given to the difference between the estimated current disturbance value and a previously estimated current disturbance value than to the current disturbance value alone—resulting in conservative disturbance rejection.

At block 220, a reference trajectory (y*) is calculated based at least in part on the set-point ($y_d$) and the set-point tracking tuning parameter ($\theta_T$). In an exemplary embodiment, the reference trajectory is calculated as shown in equation (10).

$$y^*(k+j)=\theta_T^j y^*(k)+(1-\theta_T^j)y_d(k) \quad (10)$$

As the set-point tracking tuning parameter ($\theta_T$) approaches zero, more weight is given to the set-point ($y_d$) than to the reference trajectory (y*)—resulting in aggressive set-point tracking having a relative quick response to set-point changes. As the set-point tracking tuning parameter ($\theta_T$) approaches one, less weight is given to the set-point ($y_d$) than to the reference trajectory (y*)—resulting in conservative set-point tracking.

At block 222, the control signal value, u(k), is adjusted, e.g., by the control action calculator 122 (FIG. 1) based at least in part on the reference trajectory (y*), the model prediction value (ŷ), the future disturbance value ($e_{Dp}$), and the aggressiveness tuning parameter ($\theta_A$). In an exemplary embodiment, the new control signal value, u(k), is calculated as shown in equations 11, 12, and 13.

$$u(k) = \frac{1}{b} \frac{\sum_{i=1}^{N} \eta_i(\psi_i(k))}{\sum_{i=1}^{N} \eta_i^2}; \quad (11)$$

where $$\eta_i = \frac{1-a^i}{1-a}; \text{ and} \quad (12)$$

where $$\psi_i(k) = y^*(k+i) - a^{m+i} y(k) - a^{i-1} b\mu(k,m) - e_D(k+m+i). \quad (13)$$

Equation (11) is an exemplary summation calculation over the prediction horizon, N, (see block 206) for calculating the control signal value, u(k). Equation (13) represents an updated projected error in the absence of an update to the control signal value for use in adjusting the control signal value. Steps in blocks 210 through 222 are repeated as needed to obtain the necessary values for calculating the control signal value over the prediction horizon (N). As the aggressiveness tuning parameter ($\theta_A$) approaches zero, the prediction horizon (N) approaches one sample and, thus, results in more aggressive adjustments of the control signal value by the regulatory controller 102 (FIG. 1). As the aggressiveness tuning parameter ($\theta_A$) approaches one, the prediction horizon (N) approaches an infinite number of samples and, thus, results in more conservative adjustments of the control signal value by the regulatory controller 102.

At block 224, a decision is made, e.g., by the supervisory controller 104, to continue controlling the system parameter of the plant 106 or to stop. If processing is to continue, processing proceeds at block 208. Otherwise, processing ends at block 226.

FIGS. 3–6 depict simulation results illustrating performance attributes of the regulatory controller 102 (FIG. 1) on a plant model, $g(s) = e^{-10s}/(20s+1)$, to demonstrate the direct influence of the regulatory controller tuning parameters—robustness ($\theta_R$), set-point tracking ($\theta_T$), disturbance rejection ($\theta_D$), and aggressiveness ($\theta_A$), respectively. In each of the simulations, the respective tuning parameter is set to four different values within a full scale range normalized to between zero and one. The figures illustrate that the regulatory controller becomes more conservative as each tuning parameter is increased from 0 to 1. A set-point change of 1 is made at t=0 and a load disturbance of −1 is introduced at t=150. The results illustrate the ease and transparency of tuning the regulatory controller 102 of the present invention.

Figure 3:
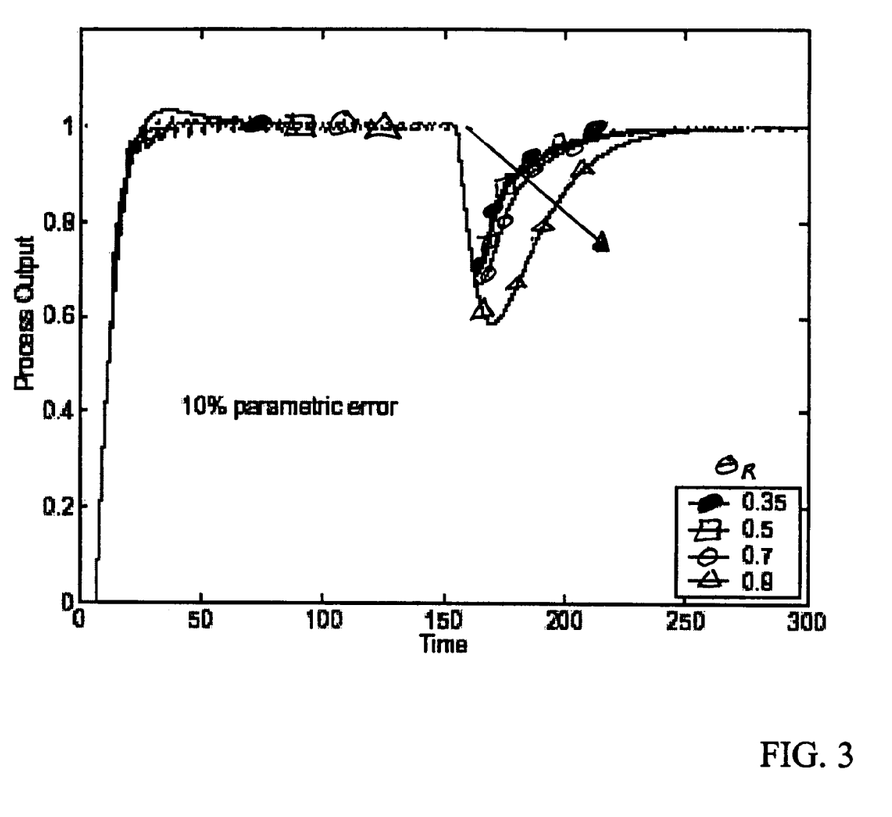
FIG. 3 is a graph depicting regulatory controller performance for different robustness tuning parameters ($\theta_R$) in accordance with the present invention.

FIG. 3 depicts regulatory controller performance for robustness tuning parameter ($\theta_R$) values of 0.35, 0.5, 0.7, and 0.9 when a 10% error is introduced between the model used for the "plant" and that used to implement the controller.

Figure 4:
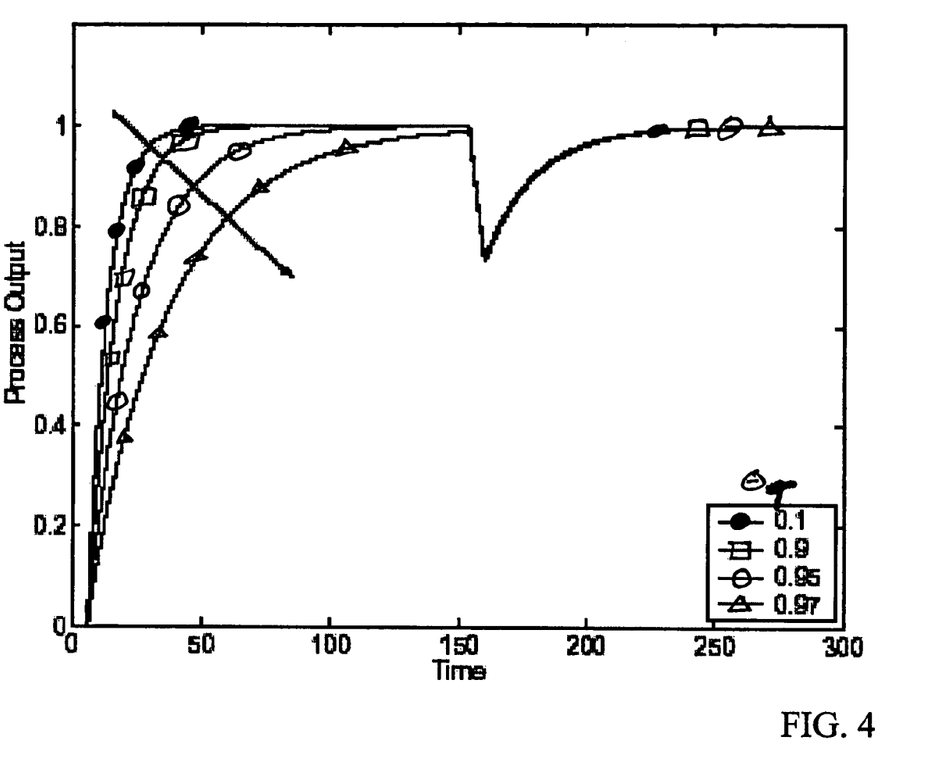
FIG. 4 is a graph depicting regulatory controller performance for different set-point tracking tuning parameters ($\theta_T$) in accordance with the present invention.

FIG. 4 depicts regulatory controller performance for set-point tracking tuning parameter ($\theta_T$) values of 0.1, 0.9, 0.95, and 0.97.

Figure 5:
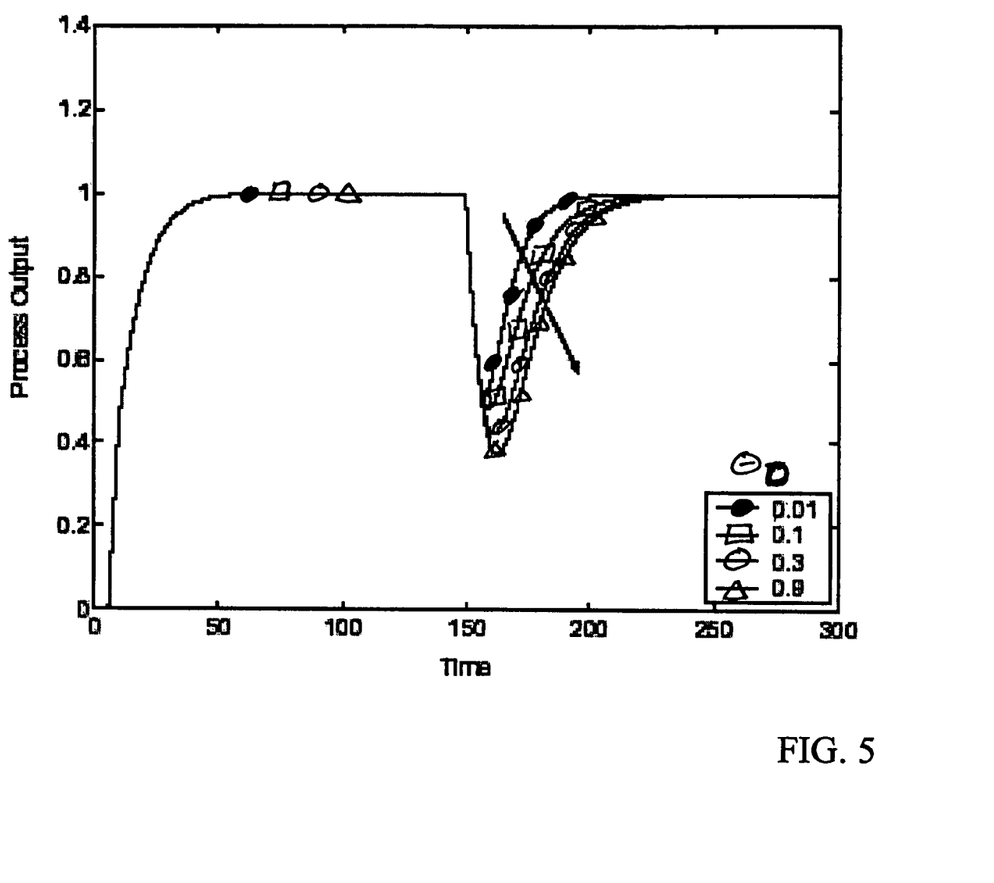
FIG. 5 is a graph depicting regulatory controller performance for different disturbance rejection tuning parameters ($\theta_D$) in accordance with the present invention.

FIG. 5 depicts regulatory controller performance for disturbance rejection tuning parameter ($\theta_D$) values of 0.01, 0.1, 0.3, and 0.9.

Figure 6:
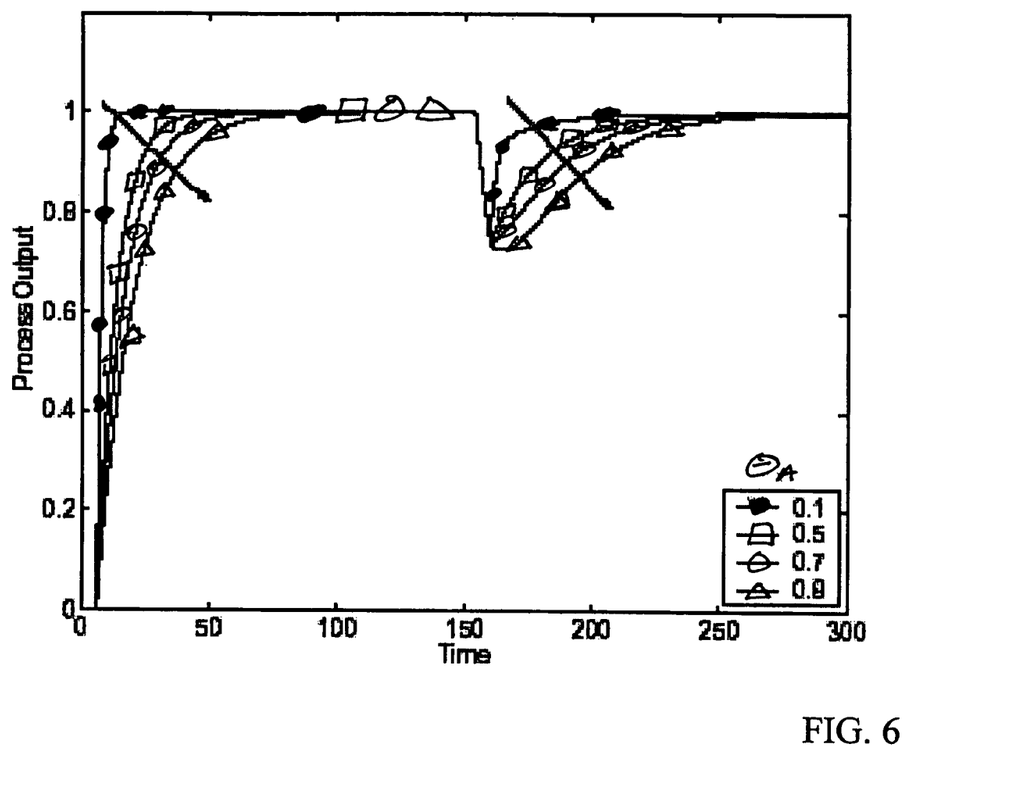
FIG. 6 is a graph depicting regulatory controller performance for different aggressiveness tuning parameters ($\theta_A$) in accordance with the present invention.

FIG. 6 depicts regulatory controller performance for aggressiveness tuning parameter ($\theta_A$) values of 0.1, 0.5, 0.7, and 0.9.

A regulatory controller 102 (FIG. 2) in accordance with the present invention enables the direct tuning of typical regulatory controller performance attributes, e.g., aggressiveness, set-point tracking, robustness, and disturbance rejection. Thus, the regulatory controller 102 can easily be tuned to meet performance objectives. In an exemplary embodiment, the tuning parameters are normalized, e.g., to fall between zero and one, thereby further simplifying tuning.

Although the invention has been described in terms of a regulatory controller 102 including a model 112, current disturbance estimator 114, future disturbance predictor 118, reference trajectory calculator 120, and control action calculator 122, it is contemplated that the invention may be implemented in software on a computer (not shown). In accordance with this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave. Alternatively, the invention may be embodied in one or more application specific integrated circuits that perform the steps described above.

Further, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for adjusting control signal values for use in controlling a plant to conform a system parameter to a set-point, the method comprising the steps of:
    receiving a set-point tracking tuning parameter, a robustness tuning parameter, a disturbance rejection tuning parameter, and an aggressiveness tuning parameter supplied by a user;
    determining a reference trajectory for the set-point based at least in part on the set-point tracking tuning parameter;
    estimating a current disturbance value for the system parameter based at least in part on the robustness tuning parameter, a model prediction value resulting from a control signal value associated with the system parameter, and an actual system value associated with the system parameter;
    predicting a future disturbance value based at least in part on the estimated current disturbance value and the disturbance rejection tuning parameter; and
    adjusting the control signal value based at least in part on the reference trajectory, the model prediction value, the future disturbance value, and the aggressiveness tuning parameter.

2. The method of claim 1, further comprising the step of:
    independently setting the aggressiveness tuning parameter, the set-point tracking tuning parameter, the robustness tuning parameter, and the disturbance rejection tuning parameter.

3. The method of claim 1, wherein each of the aggressiveness, set-point tracking, robustness, and disturbance rejection tuning parameters have a full scale range between zero and one.

4. The method of claim 1, wherein the step of determining the reference trajectory comprises the step of:

determining the reference trajectory based on the set-point, at least one previous reference trajectory, and the set-point tracking tuning parameter.

5. The method of claim 1, wherein the step of estimating the current disturbance value comprises the step of:

estimating the current disturbance value based on at least one previous estimated disturbance value, the robustness tuning parameter, and a difference between the actual system value and the model prediction value resulting from the control signal value associated with the system parameter.

6. The method of claim 1, wherein the step of predicting the future disturbance value comprises the step of:

predicting the future disturbance value based on the estimated current disturbance value, the disturbance rejection tuning parameter, and a difference between the estimated current disturbance value and at least one previous estimated disturbance value.

7. The method of claim 1, wherein the step of adjusting the control signal value is further based on at least one previous control signal value.

8. The method of claim 1, wherein the step of adjusting the control signal value comprises the steps of:

predicting a projected model error without an update to the control signal value; and adjusting the control signal value based on the projected model error.

9. The method of claim 8, wherein the projected model error is based on the set-point, the model prediction value, at least one previous control signal value, and the current disturbance value.

10. The method of claim 1, wherein the step of adjusting the control signal value comprises the steps of:

summing a plurality of projected model errors predicted over a prediction horizon, N, without an update to the control signal value; and adjusting the control signal value based at least in part on the projected model error summation.

11. A method for adjusting control signal values for use in controlling a plant to conform a system parameter to a set-point, the method comprising the steps of:

determining a reference trajectory for the set-point based at least in part on the set-point tracking tuning parameter;

estimating a current disturbance value for the system parameter based at least in part on the robustness tuning parameter, a model prediction value resulting from a control signal value associated with the system parameter, and an actual system value associated with the system parameter;

predicting a future disturbance value based at least in part on the estimated current disturbance value and the disturbance rejection tuning parameter; and adjusting the control signal value based at least in part on the reference trajectory, the model prediction value, the future disturbance value, and the aggressiveness tuning parameter;

wherein the step of adjusting the control signal value comprises the steps of summing a plurality of projected model errors predicted over a prediction horizon, N, without an update to the control signal value and adjusting the control signal value based at least in part on the projected model error summation; and wherein the prediction horizon, N, is determined by solving the equation:

$$N = 1 - \frac{\tau}{\Delta t} \log(1 - \theta_A);$$

where $\theta_A$ is the aggressiveness tuning parameter, $\tau$ is a time constant, and $\Delta t$ is a sampling time.

12. An apparatus for adjusting control signal values for use in controlling a plant to conform a system parameter to a set-point based on an actual system value associated with the plant, the apparatus comprising:

tuning parameter inputs configured to receive a set-point tracking tuning parameter, a robustness tuning parameter, a disturbance rejection tuning parameter, and an aggressiveness tuning parameter supplied by a user;

a reference trajectory calculator that determines a reference trajectory based on the set-point and the set-point tracking tuning parameter;

a model that determines a model prediction value resulting from a control signal value;

a current disturbance estimator coupled to the model, the current disturbance estimator configured to estimate a current disturbance value based on the robustness tuning parameter and a difference between the model prediction value and the actual system value;

a future disturbance predictor coupled to the current disturbance estimator, the future disturbance predictor configured to determine a future disturbance value based on the estimated current disturbance and the disturbance rejection tuning parameter; and a control action calculator coupled to the model, the reference trajectory calculator, and the future disturbance predictor, the control action calculator configured to update the control signal value based on the reference trajectory, the model prediction value, the future disturbance value, and the aggressiveness tuning parameter.

13. The apparatus of claim 12, wherein the aggressiveness, set-point tracking, robustness, and disturbance rejection tuning parameters are independently tunable.

14. The apparatus of claim 12, wherein each of the aggressiveness, set-point tracking, robustness, and disturbance rejection tuning parameters have a full scale range between zero and one.

15. The apparatus of claim 12, wherein the control action calculator is configured to update the control signal value further based on at least one previous control signal value.

16. The apparatus of claim 12, wherein the control action calculator is configured to predict a projected model error without an update of the control signal value and to update the control signal value further based on the projected model error.

17. A system for adjusting control signal values for use in controlling a plant to conform a system parameter to a set-point, the method comprising:

means for receiving a set-point tracking tuning parameter, a robustness tuning parameter, a disturbance rejection tuning parameter, and an aggressiveness tuning parameter supplied by a user;

means for determining a reference trajectory for the set-point based at least in part on the set-point tracking tuning parameter;

means for estimating a current disturbance value for the system parameter based at least in part on the robustness tuning parameter, a model prediction value resulting from a control signal value associated with the system parameter, and an actual system value associated with the system parameter;

means for predicting a future disturbance value based at least in part on the estimated current disturbance value and the disturbance rejection tuning parameter; and means for adjusting the control signal value based at least in part on the reference trajectory, the model prediction value, the future disturbance value, and the aggressiveness tuning parameter.

18. The system of claim 17, further comprising:

means for independently setting the aggressiveness tuning parameter, the set-point tracking tuning parameter, the robustness tuning parameter, and the disturbance rejection tuning parameter.

19. The system of claim 17, wherein the adjusting means comprises:

means for predicting a projected model error without an update to the control signal value; and means for adjusting the control signal value based on the projected model error.

20. A computer readable carrier including software that is configured to control a computer to implement a control method embodied in a computer readable medium for adjusting control signal values for use in controlling a plant to conform a system parameter to a set-point, the method comprising the steps of:

receiving a set-point tracking tuning parameter, a robustness tuning parameter, a disturbance rejection tuning parameter, and an aggressiveness tuning parameter supplied by a user;

determining a reference trajectory for the set-point based at least in part on the set-point tracking tuning parameter;

estimating a current disturbance value for the system parameter based at least in part on the robustness tuning parameter, a model prediction value resulting from a control signal value associated with the system parameter, and an actual system value associated with the system parameter;

predicting a future disturbance value based at least in part on the estimated current disturbance value and the disturbance rejection tuning parameter; and adjusting the control signal value based at least in part on the reference trajectory, the model prediction value, the future disturbance value, and the aggressiveness tuning parameter.

21. The computer readable carrier of claim 20, wherein the method implemented by the computer further includes the step of:

independently setting the aggressiveness tuning parameter, the set-point tracking tuning parameter, the robustness tuning parameter, and the disturbance rejection tuning parameter.

22. The computer readable carrier of claim 20, wherein the adjusting step for implementation by the computer comprises the steps of:

predicting a projected model error without an update to the control signal value; and adjusting the control signal value based on the projected model error.

* * * * *